US00RE34450E

United States Patent [19]

Saito

[11] E Patent Number: Re. 34,450

[45] Reissued Date of Patent: Nov. 23, 1993

[54] CONVEX PRESSING BOARD WITH SURFACE PROJECTING

[76] Inventor: Sorai Saito, 177-1, Sengen-cho 3-chome, Nishi-ku, Yokohama-shi, Kanagawa-ken, Japan

[21] Appl. No.: 720,204

[22] Filed: Jun. 24, 1991

Related U.S. Patent Documents

Reissue of:

[64] Patent No.: 4,903,421
Issued: Feb. 27, 1990
Appl. No.: 285,813
Filed: Dec. 16, 1988

[30] Foreign Application Priority Data

Jan. 19, 1988 [JP] Japan ..... 63-4152
Jun. 10, 1988 [JP] Japan ..... 63-76452

[51] Int. Cl.[5] ..... D06F 81/00; D06F 83/00

[52] U.S. Cl. ..... 38/137; 38/140; 38/DIG. 2; 223/57; D32/66

[58] Field of Search ..... 38/1 B, 14, 16, 18, 38/26, 74, 77.6, 93, 99, 108, 135, 137, 140, 141; 223/57, 66, 70, 73; D32/66; 156/583.1, 583.3; 108/47, 118, 121

[56] References Cited

U.S. PATENT DOCUMENTS

| | | | |
|---|---|---|---|
| 533,793 | 2/1895 | Doyle | 38/108 |
| 922,487 | 5/1909 | Knorr | 38/137 X |
| 1,154,726 | 9/1915 | Ramlow | 38/137 X |
| 1,681,965 | 8/1928 | Zeidler | 38/14 X |
| 1,754,665 | 4/1930 | Anthony | 38/66 |
| 1,870,934 | 8/1932 | Strobridge | 38/66 |
| 2,058,953 | 10/1936 | Coleman | 223/57 |
| 2,120,340 | 6/1938 | Rear | 38/18 X |
| 2,220,962 | 11/1940 | Kingman | 38/137 X |
| 2,274,598 | 2/1942 | Fay et al. | 38/137 |
| 2,313,135 | 3/1943 | Fay | 38/137 |
| 2,314,498 | 3/1943 | Hoagland | 38/141 |
| 2,521,512 | 9/1950 | Gayring | 36/16 X |
| 2,632,968 | 3/1953 | Ray | 38/66 |
| 2,645,046 | 7/1953 | Frej | 38/137 |
| 2,652,646 | 9/1953 | Cave | 38/136 |
| 2,729,906 | 1/1956 | Kleinsorge | 38/135 |
| 2,766,537 | 10/1956 | Pruitt | 38/123 |
| 2,803,897 | 8/1957 | Miyamoto | 38/137 |
| 2,880,529 | 4/1959 | Freeman | 38/66 |
| 2,887,798 | 5/1959 | Percy | 38/66 |
| 2,906,044 | 9/1959 | Whiteley | 38/137 |
| 2,907,127 | 10/1959 | Waugh et al. | 38/137 |
| 3,050,220 | 8/1962 | Paris | 223/57 |
| 3,165,845 | 1/1965 | Kroenke | 38/135 |
| 3,221,426 | 12/1965 | Zeidler | 38/66 |
| 3,238,650 | 3/1966 | Mullen | 38/93 |
| 3,620,354 | 11/1971 | McMillan | 223/57 |
| 4,158,265 | 6/1979 | Kroenke | 38/135 |
| 4,689,905 | 9/1987 | Vartan | 38/26 |
| 4,903,421 | 2/1990 | Saito | 38/137 |

FOREIGN PATENT DOCUMENTS

| | | | |
|---|---|---|---|
| 0825237 | 1/1952 | Fed. Rep. of Germany . | |
| 0912684 | 5/1954 | Fed. Rep. of Germany . | |
| 1154430 | 9/1963 | Fed. Rep. of Germany | 38/66 |
| 0181432 | 5/1936 | Switzerland . | |
| 0298851 | 8/1954 | Switzerland . | |
| 0697615 | 11/1979 | U.S.S.R. | 38/140 |
| 0240985 | 10/1925 | United Kingdom | 38/66 |
| 0542770 | 1/1942 | United Kingdom . | |
| 0658451 | 10/1951 | United Kingdom . | |
| 772552 | 4/1957 | United Kingdom . | |
| 0801393 | 9/1958 | United Kingdom . | |
| 0948529 | 2/1964 | United Kingdom . | |
| 2084616 | 4/1982 | United Kingdom | 38/137 |
| 2214197 | 8/1989 | United Kingdom | 38/137 |

OTHER PUBLICATIONS

Japanese Language Leaflet Published Oct. 1970, Author: Sorai Saito, one page, front and back.

*Primary Examiner*—Clifford D. Crowder
*Assistant Examiner*—Ismael Izaguirre
*Attorney, Agent, or Firm*—Frishauf, Holtz, Goodman & Woodward

[57] ABSTRACT

A rounded pressing board substantially providing a line or point contact surface between the iron working surface and the bottom surface of a flat iron, thus reducing the force required to operate an iron and shortening the ironing time. The pressing board body is molded into a hollow shape by blow molding and the iron working surface of the pressing board body has a large number of projections to facilitate the application of steam to the cloth which is to be ironed and to provide the line or point contact surface.

34 Claims, 11 Drawing Sheets

CONVEX PRESSING BOARD WITH SURFACE PROJECTING

Matter enclosed in heavy brackets [ ] appears in the original patent but forms no part of this reissue specification; matter printed in italics indicates the additions made by reissue.

BACKGROUND OF THE INVENTION

The present invention relates to a pressing board and, more particularly, to a pressing board having a rounded surface.

FIG. 13 is a side sectional view of a conventional pressing board 100. Referring to FIG. 13, the pressing board 100 is constructed as follows. A rectangular flat board is employed as a base material 2, a cushion material 4 with proper shock absorbing property and a uniform thickness is stuffed between the base material 2 and a covering cloth 3 covering the base material 2, and ends of the covering cloth 3 are stapled to the base material 2 by a plurality of rivets 5.

When an iron I is pressed on a clothing C using the pressing board 100, heat generated from the flat back surface of the heated iron I is applied to the clothing, and the clothing is flattened by the back surface. Thus, wrinkles of the clothing C are ironed out.

The base material 2 of the conventional pressing board 100 employs a solid particle board or plywood in consideration of mechanical strength, cost, and the like.

As is known, a metal gauze or the like can be used as the base material 2 of the pressing board in order to facilitate release of steam when a steam iron is used.

Normally, in the pressing board, a rectangular flat board is employed as the base material 2, the cushion material 4 with proper shock absorbing property and a uniform thickness is stuffed between the base material 2 and the covering cloth 3 covering the base material 2, and ends of the covering cloth 3 are stapled to the base material 2 by the plurality of rivets 5.

When a steam iron is used, steam generated by the steam iron temporarily passes through the clothing, and is then filled between the covering cloth 3 and the base material 2. The base material 2 sometimes employs a metal gauze or the like in order to facilitate release of steam, thereby preventing steam from being filled as described above. In this case, since the metal gauze releases too much steam, the steam cannot be effectively utilized.

The solid particle board or plywood has a sufficient mechanical strength but has a large weight and is not easy to handle. For this reason, the base material 2 serving as the base portion of the pressing board is preferably formed by resin molding such as blow molding capable of forming a hollow member, thus reducing weight and cost.

However, since the conventional pressing board 100 is constructed as described above, when the iron I is moved in a direction indicated by arrow z, in particular, when the clothing C is thin like a white shirt, the clothing C is excessively squeezed and stretched by the back surface and the corner of the back surface of the iron I, and a crease A may be created. If the iron is moved in such situation, more wrinkles are left on the clothing C.

When a sliding frictional resistance between the iron I and the clothing C is large, undesirable luster may be left on the clothing C.

Therefore, the ironing operation using the conventional flat pressing board 100 requires skill and time.

Since the conventional pressing board is constructed as described above, steam is easily released, and cannot be sufficiently applied to the clothing.

A low cost resin material used for blow molding can't withstand high temperatures, and has poor mechanical strength. Such a resin material cannot be used for the pressing board.

SUMMARY OF THE INVENTION

The present invention has been made in consideration of the above problems, and has as its first object to provide a pressing board in which its iron working surface is rounded so as to achieve an almost line or point contact state between the back surface of an iron and the working surface, thereby preventing creation of a crease, and which has a low iron sliding frictional resistance so as not to require skill in ironing, and so as to shorten an ironing time.

It is a second object of the present invention to provide a pressing board in which a cushion material is appropriately deformed to prevent the clothing to be ironed from being damaged.

It is a third object of the present invention to provide a pressing board in which a large number of projections are formed on a working surface on which an iron is pressed so as to increase a heat resistance and to fill steam between adjacent projections, so that steam can be effectively applied to the clothing to be ironed, and which can have a sufficient mechanical strength even if it is formed of a resin material by relatively inexpensive blow molding or the like.

It is a fourth object of the present invention to provide a pressing board with excellent workability on which a clothing can be easily spread.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Various embodiments of a pressing board according to the present invention will now be described with reference to the accompanying drawings.

Figure 1A:
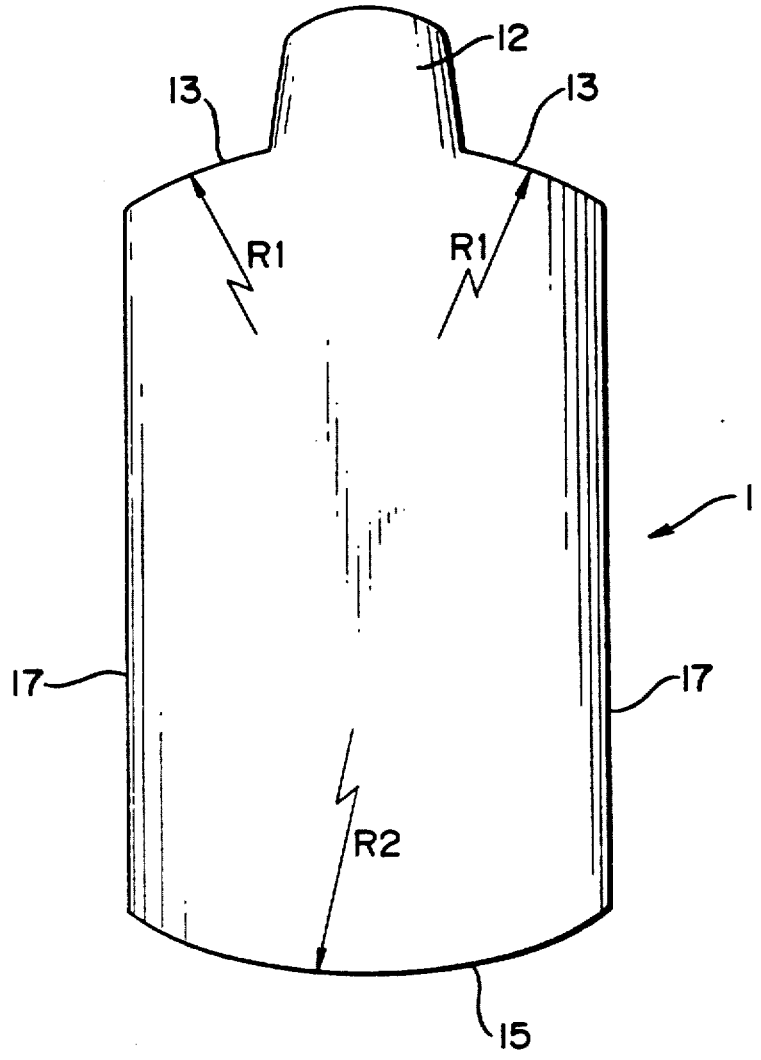
FIG. 1A is a plan view of a first embodiment of a pressing board 1.

Referring to FIG. 1A, the pressing board 1 has substantially the shape of a body with a pair of longitudinal sides 17 which are sufficiently longer than lateral sides. On one lateral side, a head 12 and a pair of shoulders 13 are formed, and on the other lateral side, a border 15 is formed.

The pair of shoulders 13 are formed by parts of circles having a radius R1, whereas the border 15 is formed by part of a circle having a radius R2.

Although it is ideal to prepare various sizes of pressing boards 1 for use as clothings of adults and children, it is enough to prepare a pressing board for adults use only in consideration of the frequency of use.

Figure 1B:
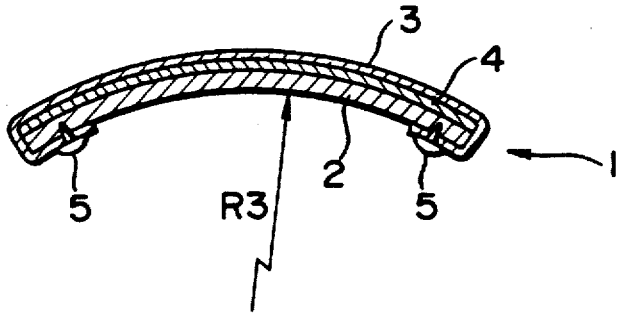
FIG. 1B is a cross-sectional side view of FIG. 1A.

Referring to FIG. 1B, the pressing board 1 is constructed as follows. The substantially body-shaped board rounded to form a convexly shaped outer surface with a radius R3 and to serve as a base material 2. A cushion material 4 having proper shock absorbing property and uniform thickness is stuffed between the base material 2 and a covering cloth 3 covering the base material 2. Ends of the cloth 3 are stapled to the base material 2 by a plurality of rivets 5.

Figure 2A:
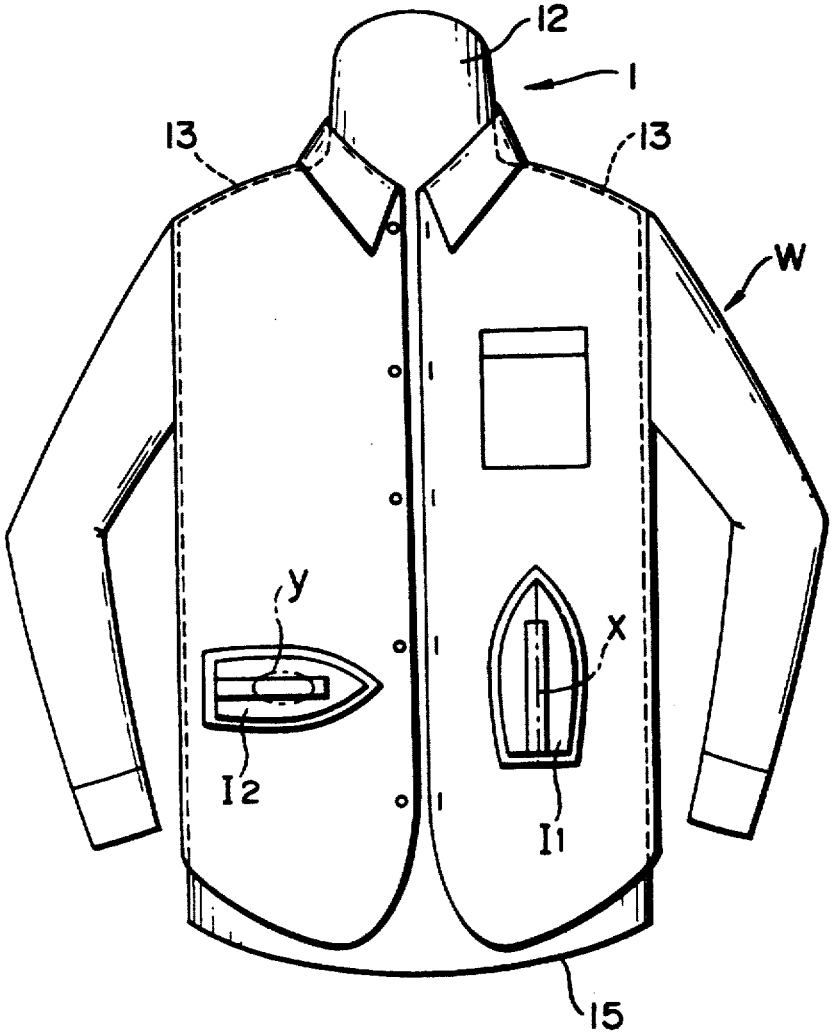
FIG. 2A is a plan view showing a state wherein a white shirt W is put on the pressing board 1.

Referring to FIG. 2A, the back portion of the white shirt W is located on the back side of the pressing board 1, so that the head 12 of the pressing board 1 extends from the neck portion of the white shirt W.

When the white shirt W is put on the pressing board 1, the shoulders 13, formed as parts of circles, cause proper tension force in the inner portion of the shoulder part of the white shirt W. Thus, the ironing operation can be performed without pressing the white shirt W by a second hand.

Figure 2B:
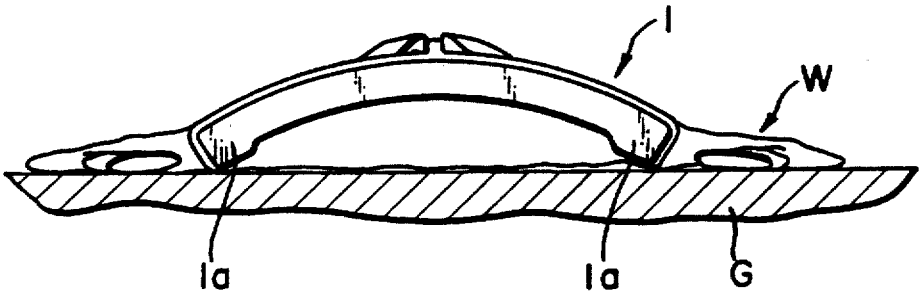
FIG. 2B is a side view showing a state wherein after the white shirt W is put on the pressing board 1, the pressing board 1 is placed on a working base G.

Referring to FIG. 2B, the back of the white shirt W is supported between both ends 1a of the pressing board 1 and the working base G. Thus, during ironing, the white shirt W need only be lightly pressed by hand.

Figure 3:
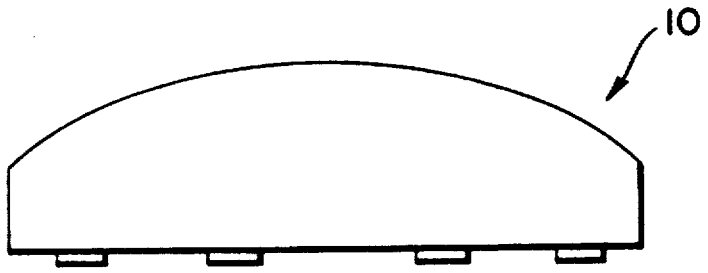
FIG. 3 is a side view of a pressing board 10 of a second embodiment.

As can be seen from FIG. 3, the pressing board 10 has a flat back surface in order to achieve stability in use.

Referring again to FIG. 2A, the state of use of the pressing board 1 will be described below. When the iron I is pressed on a white shirt W put on the pressing board 1 and is placed parallel to the longitudinal direction of the pressing board 1, as indicated by I1 in FIG. 2A, a contact state between the iron I and the white shirt W is approximate to a line contact state indicated by a dotted line x in FIG. 2A. Meanwhile, when the iron I is placed to be perpendicular to the longitudinal direction of the pressing board 1, the contact state is approximate to a point contact state as indicated by a dotted line y.

Since the cushion material 4 is appropriately deformed to serve as a shock absorbing material, the clothing C of the white shirt W can be prevented from being damaged.

Therefore, the iron I contacts the white shirt in this manner, so that creation of crease as the conventional problem can be prevented, and a sliding frictional resistance can be reduced. As a result, an ironing operation can be performed while turning the iron I, thus preventing damage to the clothing C.

Sleeves of clothings, trousers, skirt, and the like can be ironed on the rounded iron working surface.

In the above description, the base material 2 has a rounded surface as a part of circle with the radius R3 but may have a more complicated rounded surface.

Figure 4A:
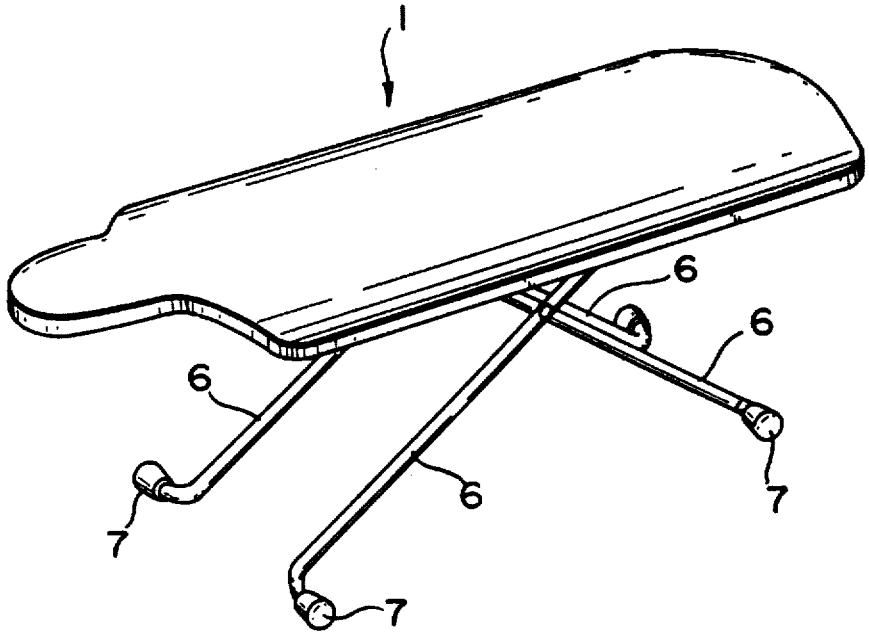
FIG. 4A is a perspective view showing an outer appearance of a state wherein a pressing board 1 of a third embodiment is in use.
Figure 4B:
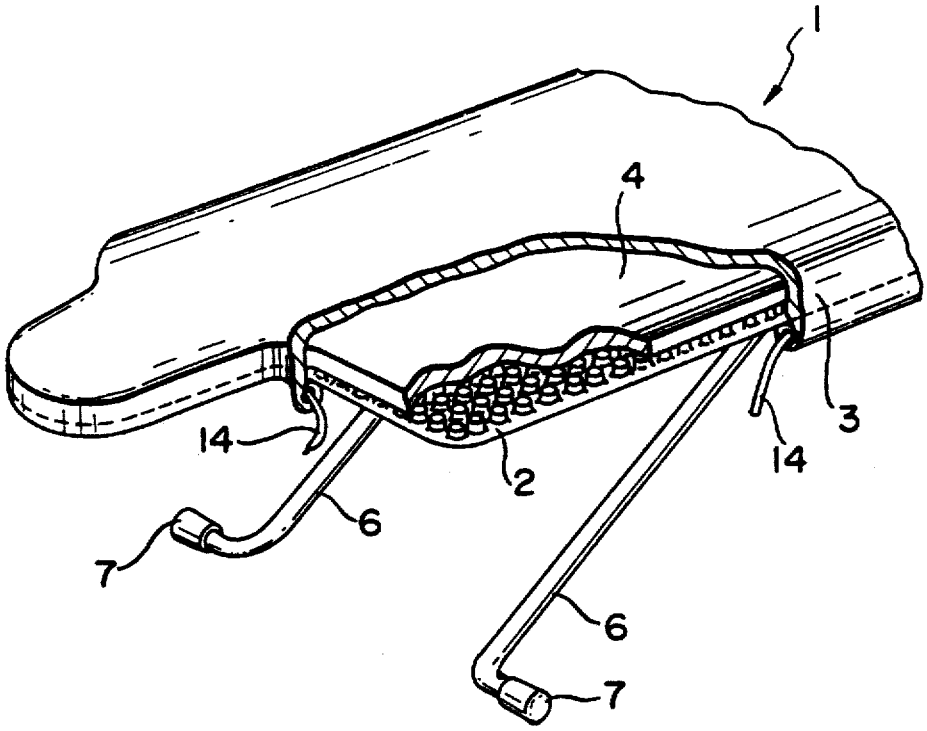
FIG. 4B is a partially cutaway perspective view of FIG. 4A.

Referring to FIGS. 4A and 4B, the iron working surface of the pressing board 1 is rounded upward, so that a contact state between an iron and the iron working surface is not a surface contact state but is approximate to the above-mentioned line or point contact state.

The pressing board 1 is constructed as follows. A cushion material 4 with proper shock absorbing property and uniform thickness is arranged under a covering cloth 3 covering the entire iron working surface of the pressing board 1. Ends of the cloth 3 are fixed to the base material 2 by a plurality of rivets (not shown) or laces 14.

Foldable legs 6 on the distal ends of which rubber shoes 7 are fitted under pressure are provided to the back surface portion of the base material 2.

Figure 5:
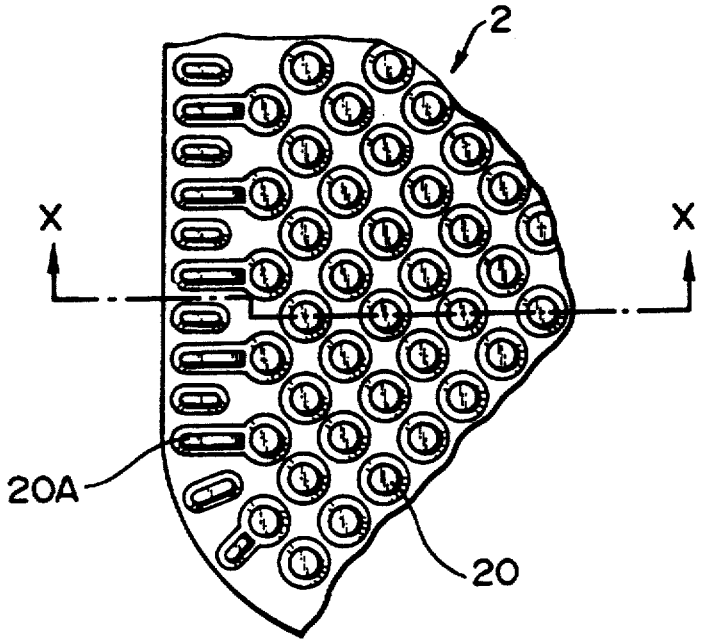
FIG. 5 is a plan view showing a part of a corner portion of a base material 2 of the pressing board 1 shown in FIG. 4B.
Figure 6:
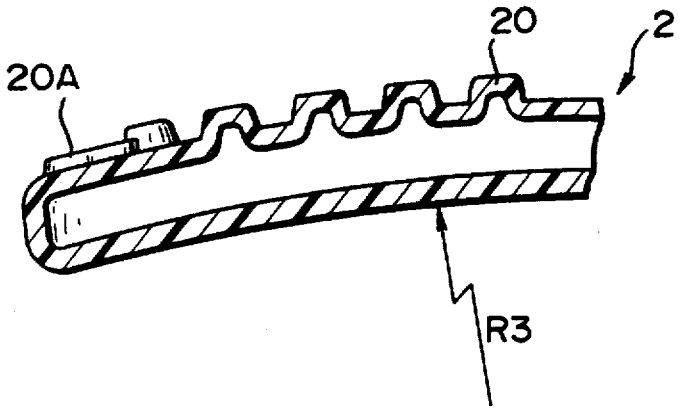
FIG. 6 is a sectional view taken along a line X—X in FIG. 5.

In FIGS. 5 and 6, a large number of circular projections 20 extending upwardly and substantially normal to the working surface are formed on the top surface, i.e. the iron working surface of the base material 2, and projecting members 20A are formed on its edge portion. The base material 2 has a hollow structure as shown in FIG. 5 since it is formed by blow molding.

Figure 7:
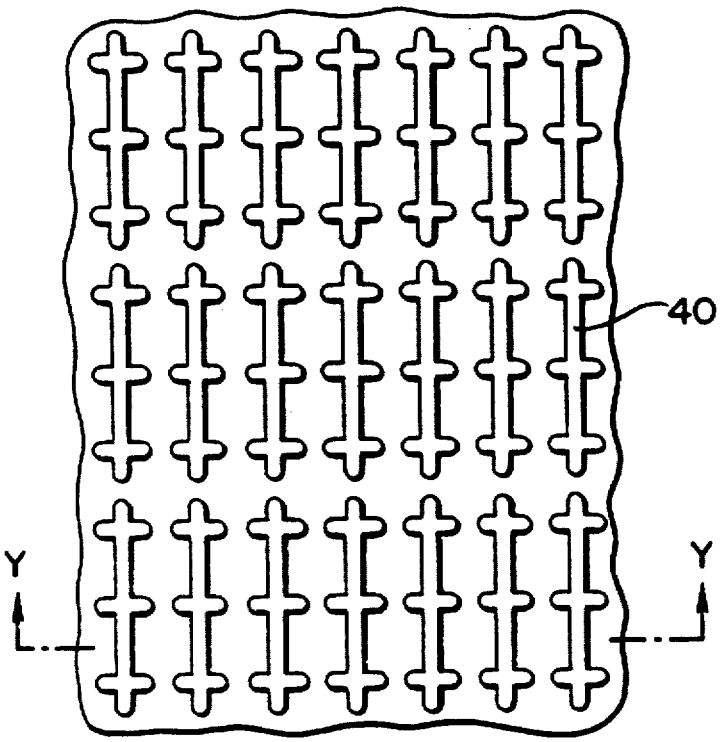
FIG. 7 is a plan view showing a part of the base material 2 of the pressing board 1 shown in FIG. 4A.
Figure 8:
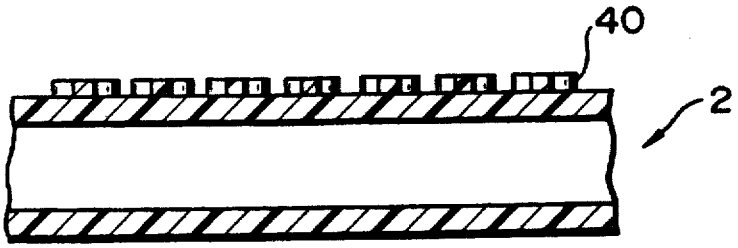
FIG. 8 is a sectional view taken along a line Y—Y in FIG. 7.

In FIGS. 7 and 8, a large number of projections 40 each having an illustrated shape are formed on the top surface, i.e., the iron working surface of the base material 2. A large number of projections 40 each having a shape other than the illustrated shape may be formed.

Figure 9:
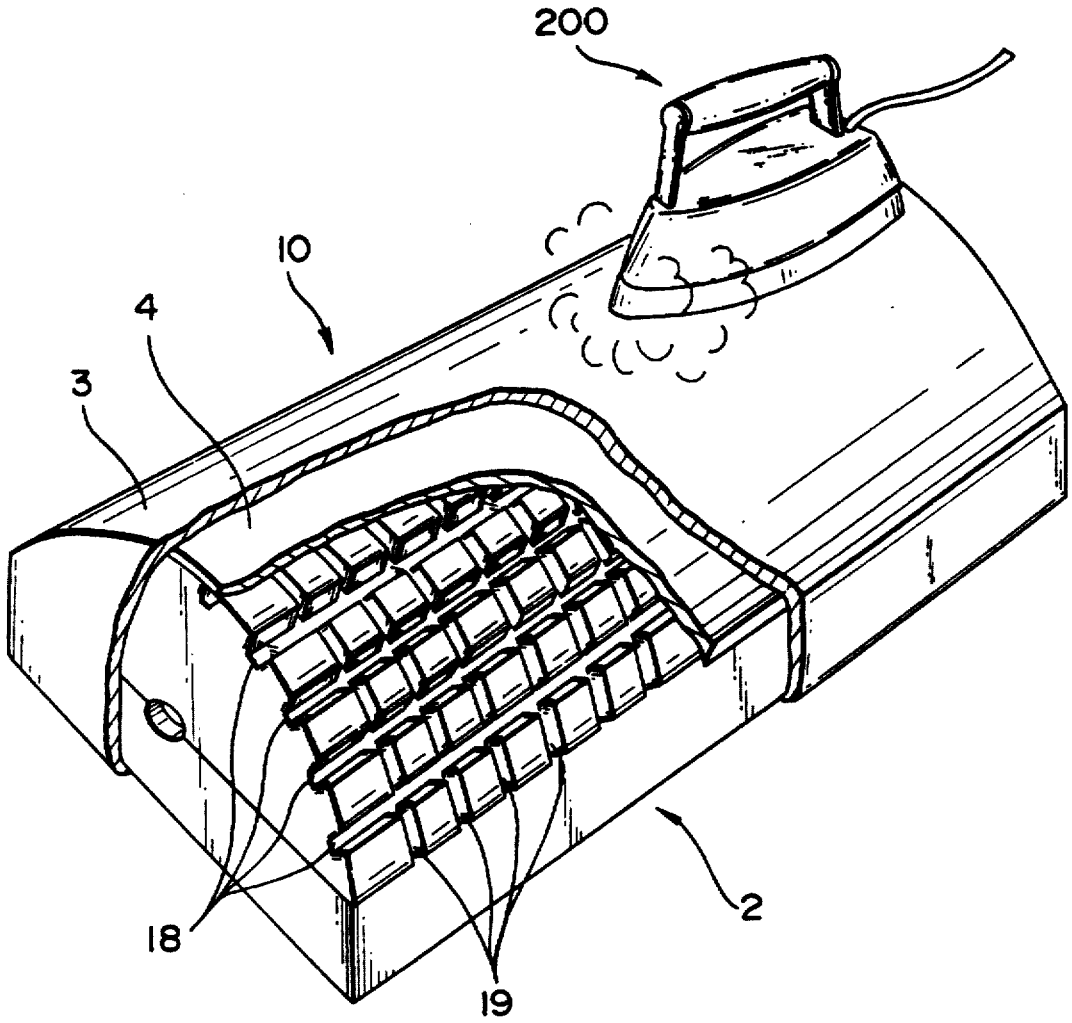
FIG. 9 is a partially cutaway perspective view showing a pressing board 10 of a fourth embodiment, and a steam iron 200.

In FIG. 9, the pressing board 10 is constructed as follows. That is, as shown in FIG. 9, a large number of longitudinal and lateral grooves 18 and 19 are formed in the working surface, on which the steam iron 200 is pressed, of the base material 2 of the pressing board 10. A cushion material 4 having proper shock absorbing property and uniform thickness is arranged between the working surface and a covering cloth 3 covering the entire surface of the working surface on which the steam iron 200 is pressed. Ends of the cloth 3 are fixed to the base material 2 by a plurality of rivets (not shown) or rubber laces. In consideration of easy removal from molds upon blow molding, appropriate removal slopes are formed on the side walls of the longitudinal and lateral grooves 18 and 19.

The function of the pressing boards 1 and 10 shown in FIGS. 4A and 9, respectively, i.e., a case wherein the steam iron 200 is used, will be described with reference to FIG. 10.

The same function can be obtained by the pressing board 1 on which the large number of projections 20 are formed shown as in FIG. 5. Therefore, a description will now be made with reference to only FIG. 10.

Figure 10:
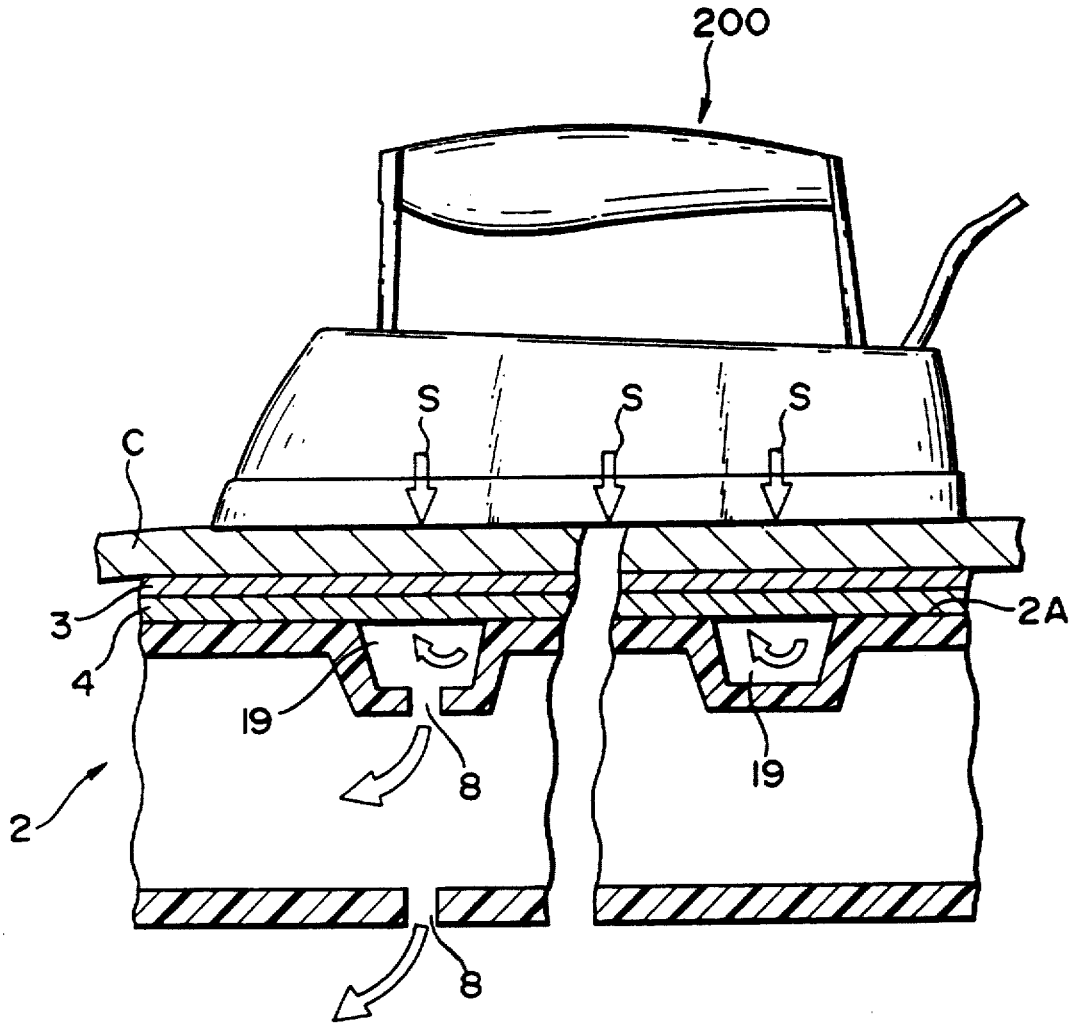
FIG. 10 is a sectional view cut along a plane parallel to a longitudinal groove 18 of the pressing board 1 of the fourth embodiment.

In FIG. 10, steam S is generated by the steam iron 200, and is applied to the clothing C. Of the steam S passing through the clothing C, a steam S component reaching a top surface 2A is applied to the clothing C in the same manner as in the conventional pressing board. A steam S component reaching the lateral or longitudinal groove 19 or 18 is stored in the groove. As a result, the clothing C is vertically sandwiched by the steam S components. That is, since the steam S is caught in the grooves, the clothing C is steamed, and hence, the steam can be effectively applied to the clothing C.

On the other hand, some components of the steam S generated by the steam iron 200 are appropriately released inside the base material 2 through steam holes 8. Excessive steam S components are released to air through steam holes 8 formed in the back surface of the base material 2.

Furthermore, since the longitudinal and lateral grooves 18 and 19 and the projections 20 serve as heat radiation members, heat generated from the iron can be appropriately radiated. Therefore, the base material 2 can be formed of a blow-molded material having a low heat-resistant temperature.

Note that in the above embodiment, the longitudinal and lateral grooves are formed in the base material 2. However, grooves may be formed obliquely in a diamond shape, or recesses may be locally formed. With this structure, the same result can be obtained as a matter of course.

Figure 11A:
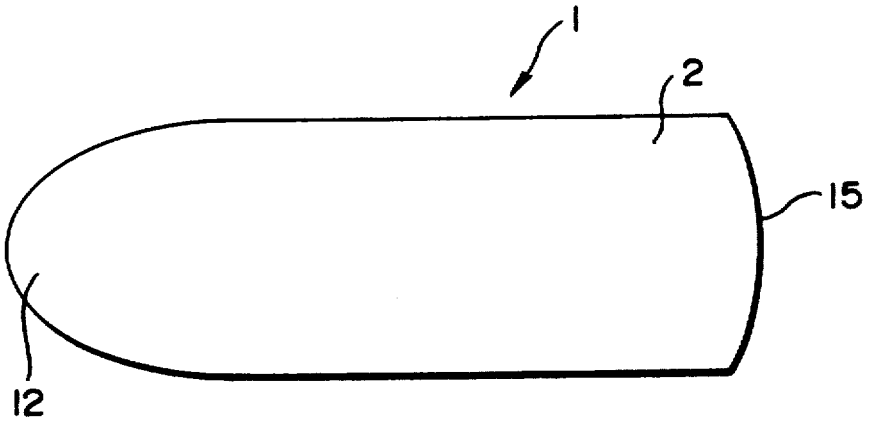
FIGS. 11A, 11B, and 11C are plan views of a base material 2 of a pressing board 1 of other embodiments.

Referring to FIG. 11A, in order to obtain a ship-like shape shown in the drawing a head 12 and a border 15 are formed.

Figure 11B:
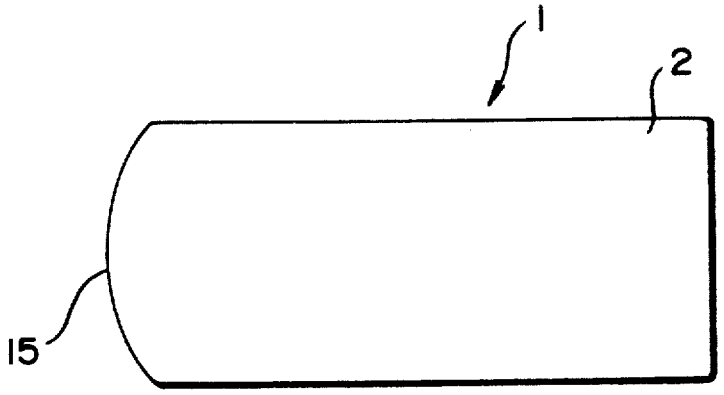
Figure 11C:
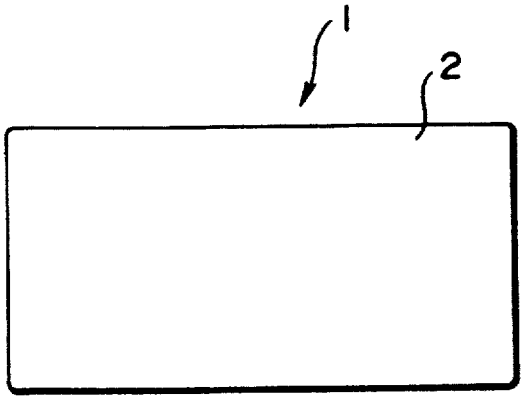
Figure 13:
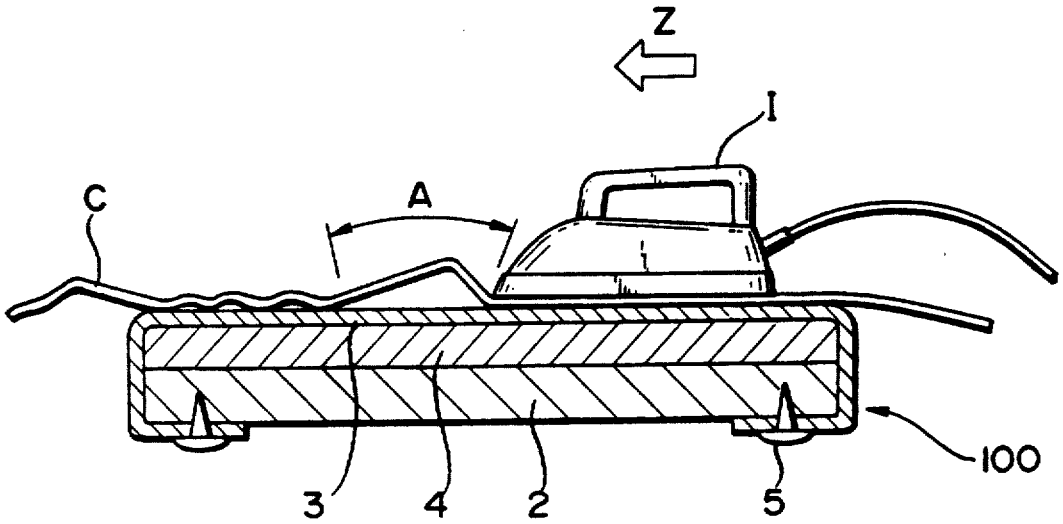
FIG. 13 (PRIOR ART)
FIG. 13 is a side sectional view of a conventional pressing board 100.

Referring to FIG. 11C, in this embodiment, a border 15 and a linear side are formed.

Referring to FIG. 11C, in this embodiment, two linear sides are formed.

When the pressing board 1 is constructed using the base material 2 having the shape illustrated in FIG. 11A, 11B, or 11C, the iron working surface of the pressing board 1 is rounded upward, and a contact state between the iron and the working surface almost becomes the line or point contact state, as described above, thus facilitating ironing.

Figure 12A:
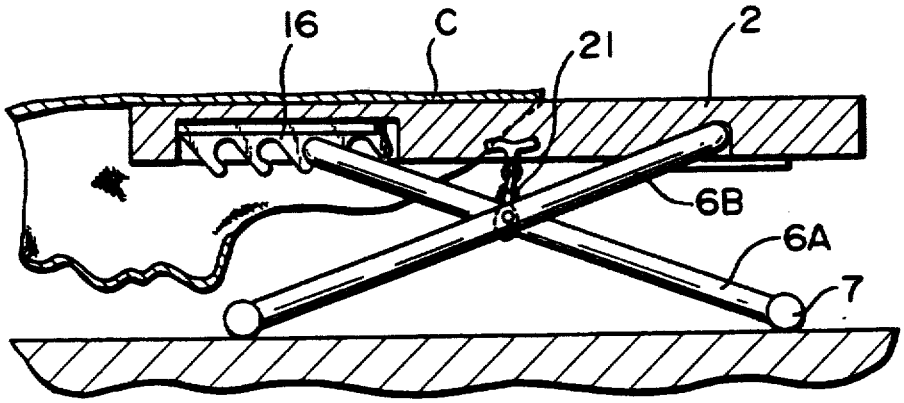
FIGS. 12A, 12B, and 12C are side views showing states wherein legs 6 are provided to the base material 2.

Referring to FIG. 12A, the legs 6 of the pressing board are retractably arranged on the base material 2. Legs 6A and 6B cross at the central portion. When the end portion of the leg 6A is engaged with an engaging hole of a hook 16, the illustrated height can be held. The portion of clothing which is not subjected to ironing is housed in a gap portion defined according to the height of the legs 6, and the portion of the clothing C, which is to be ironed is spread on the pressing board, so that the it can be ironed.

A chain 21 is bridged between the crossing portion of the legs 6A and 6B and the base material 2, so that the legs 6 are not excessively separated from the base material 2.

Figure 12B:
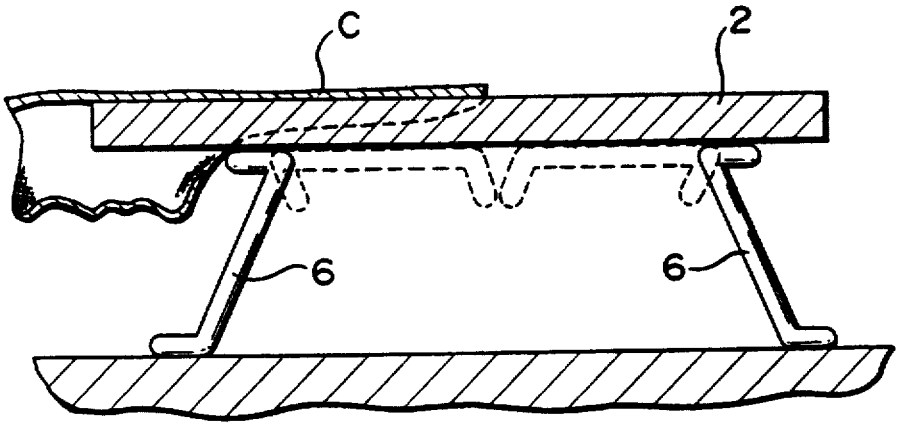
Figure 12C:
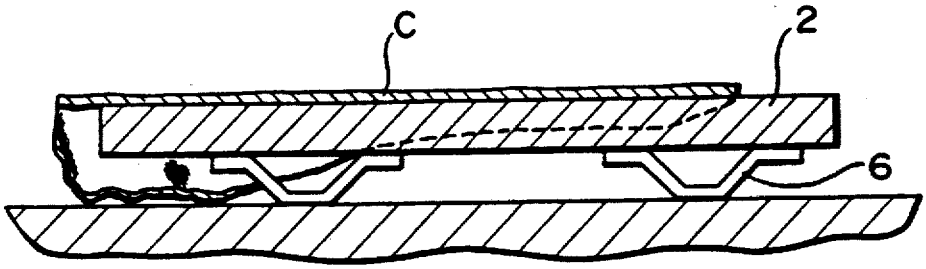

FIGS. 12B and 12C are side views which show modifications of the legs 6. A portion the clothing is housed under the pressing board, and a portion to be ironed of the clothing C is spread on the pressing board, so that the clothing can be ironed.

As many apparently widely different embodiments of the present invention can be made without departing from the spirit and scope thereof, it is to be understood that the invention is not limited to the specific embodiments thereof except as defined in the appended claims.

What is claimed is:

1. A pressing board [combination of] *adapted for use with* a flat pressing iron and *comprising* a pressing board body, said body being elongated and having longer and shorter sides, said body being further rounded upwardly to form a [convex by] *convexly* shaped upper iron working surface thereof so as to substantially provide a line or point contact support on said upper iron working surface of said pressing board body for the bottom surface of said flat pressing iron for reducing the likelihood of creating an unwanted crease in clothing ironed thereon, said upper iron working surface of said pressing board body having a large number of projections extending upwardly and substantially normal to the working surface and [which support] *supporting* clothing *to be* ironed on the board when pressed on said pressing board body with the bottom surface of the pressing iron.

2. The pressing board [combination] according to claim 1, wherein a head and shoulders are formed on at least one of the shorter sides.

3. The pressing board [combination] according to claim 1, wherein there is provided a covering cloth, on which clothing is ironed, for said upper iron working surface, and a cushion material having a shock absorbing property which is provided to lie between the iron working surface of the pressing board body and the covering cloth on which the clothing is ironed.

4. The pressing board [combination] according to claim 1, wherein said pressing board has a large number of grooves formed in the upper iron working surface of said pressing board body.

5. The pressing board [combination] according to claim 1, wherein said pressing board body contains a large number of steam release holes.

6. The pressing board [combination] according to claim 1, wherein said pressing board has legs.

7. The pressing board [combination] according to claim 1, wherein said pressing board is formed into a ship-like shape when said board is viewed from the top.

8. The pressing board [combination] according to claim 1, wherein one of the shorter sides of said pressing board body forms an outwardly curved end [edges] *edge.*

9. The pressing board [combination] according to claim 1, wherein said pressing board is blow molded.

10. The pressing board [combination] according to claim 9 wherein one of the shorter sides of the pressing board body is formed to extend outwardly in the shape of a neck and shoulders, and wherein said shoulders are formed by arcs which create an inner tension between [the shoulder part of the] *shoulder parts of a* shirt to be ironed when an iron is pressed down with [on] *one* hand and to limit the need for application of pressure with a second hand.

11. The pressing board [combination] according to claim 9 wherein there is provided a covering cloth on which clothing is ironed for said upper iron working surface, and a cushion material having a shock absorbing property is placed between the iron working surface of the pressing board body and the covering cloth on which the clothing is [pressed] *ironed.*

12. The pressing board [combination] according to claim 9, wherein said pressing board body has a large number of grooves formed in the iron working surface of said pressing board body.

13. The pressing board [combination] according to claim 9, wherein said pressing board body contains a large number of steam release holes.

14. The pressing board [combination] according to claim 9 wherein said pressing board has legs.

15. The pressing board [combination] according to claim 9 wherein said pressing board is formed into a ship-like shape when said pressing board is viewed from the top.

16. The pressing board [combination] according to claim 9 wherein one of the shorter sides of said pressing board body forms an outwardly curved end edge.

17. The pressing board [combination] according to claim [9] *1* wherein the upper iron working surface of said pressing board body is made of wood.

18. The pressing board [combination] according to claim [9] *1* wherein the upper iron working surface of said pressing board body is made of metal gauze.

*19. The pressing board according to claim 1, wherein one of the shorter sides of the pressing board body is formed to extend outwardly in the shape of a neck and shoulders, and wherein said shoulders are formed by arcs which create an inner tension between shoulder parts of a shirt to be ironed when an iron is pressed down with one hand and to limit the need for application of pressure with a second hand.*

*20. A pressing board comprising:*

*a body having an upper working surface being convexly rounded in a longitudinal direction and having a large number of projections with a large number of grooves between, respectively, adjacent ones of said large number of projections;*

*a cover covering all of said working surfaces; and*

*holes formed in said grooves and leading outside of said body, said grooves being steam filled and acting to steam clothes being ironed, and said holes being provided for releasing excessive steam from said grooves.*

*21. The pressing board according to claim 20, wherein said body is elongated and has longer and shorter sides, and wherein a head and shoulders are formed on at least one of the shorter sides of said pressing board.*

*22. The pressing board according to claim 20, wherein said depressions comprise a large number of grooves formed in said upwardly facing working surface of said body.*

*23. The pressing board according to claim 20, wherein said pressing board body contains a large number of said steam release holes.*

*24. The pressing board according to claim 20, wherein said pressing board has legs.*

*25. the pressing board according to claim 20, wherein said pressing board is ship-like shaped when said board is viewed from the top.*

*26. The pressing board according to claim 20, wherein said body is elongated and has longer and shorter sides, and wherein one of the shorter sides of said body has an outwardly curved end edge.*

*27. The pressing board according to claim 20, wherein said body has a blow-molded, hollow construction.*

*28. The pressing board according to claim 27, wherein said body is elongated and has longer and shorter sides, and wherein one of the shorter sides of the pressing board body extends outwardly in the shape of a neck and shoulders, and wherein said shoulders are formed by arcs which create an inner tension between the shoulder parts of a shirt to be ironed when an iron is pressed down with one hand and to limit the need for application of pressure with a second hand.*

*29. The pressing board according to claim 27, wherein the cover for the upper working surface comprises a covering cloth on which the clothing is ironed, and a cushion material having a shock absorbing property placed between the working surface of the pressing board body and the covering cloth on which the clothing is ironed.*

*30. The pressing board according to claim 27, wherein said pressing board body contains a large number of said steam release apertures.*

*31. The pressing board according to claim 27, wherein said pressing board has legs.*

*32. The pressing board according to claim 27, wherein said pressing board, when viewed from the top, is ship-like shaped.*

*33. The pressing board according to claim 27, wherein said body is elongated and has longer and shorter sides, and wherein one of the shorter sides of said pressing board body has an outwardly curved end edge.*

*34. The pressing board according to claim 20, wherein said body is elongated and has longer and shorter sides, and wherein one of the shorter sides of the pressing board body extends outwardly in the shape of a neck and shoulders, and wherein said shoulders are formed by arcs which create an inner tension between shoulder parts of a shirt to be ironed when an iron is pressed down with one hand and to limit the need for application of pressure with a second hand.*

* * * * *